United States Patent
Geller et al.

(10) Patent No.: US 7,877,659 B2
(45) Date of Patent: Jan. 25, 2011

(54) MEMORY MODEL FOR FUNCTIONAL VERIFICATION OF MULTI-PROCESSOR SYSTEMS

(75) Inventors: Felix Geller, Haifa (IL); Yehuda Naveh, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1122 days.

(21) Appl. No.: 11/554,053

(22) Filed: Oct. 30, 2006

(65) Prior Publication Data

US 2008/0115027 A1    May 15, 2008

(51) Int. Cl.
*G01R 31/28* (2006.01)

(52) U.S. Cl. ........... 714/741; 714/724; 714/738; 714/742; 711/147; 703/4; 703/13; 703/14; 703/15

(58) Field of Classification Search ............ None
See application file for complete search history.

(56) References Cited

U.S. PATENT DOCUMENTS

| | | | |
|---|---|---|---|
| 5,617,510 A | | 4/1997 | Keyrouz et al. |
| 5,636,328 A | | 6/1997 | Kautz et al. |
| 5,860,126 A | * | 1/1999 | Mittal ............... 711/167 |
| 6,526,481 B1 | * | 2/2003 | Shen et al. ........... 711/147 |
| 6,606,721 B1 | | 8/2003 | Gowin, Jr. et al. |
| 6,609,229 B1 | | 8/2003 | Ly et al. |
| 2002/0026303 A1 | * | 2/2002 | Watanabe et al. ........ 703/25 |
| 2004/0093476 A1 | * | 5/2004 | Thompson et al. ....... 711/220 |
| 2005/0222827 A1 | | 10/2005 | Emek et al. |

OTHER PUBLICATIONS

R. Emek, et al., X-Gen, a random test-case generator for systems and SoCs, Seventh IEEE International High-Level Design Validation and Test Workshop (HLDVT 2002).*
A. Adir and G. Shurek, Generating Concurrent Test Programs with Collisions for Multi-Processor Ver~cation, HLDVT (2002).*
E. Bin, R. Emek, G. Shurek, and A. Ziv, Using Constraint Satisfaction Formulations and Solution Techniques for Random Test Program Generation, IBM Systems Journal, 41(3): 386402, Aug. 2002.*
A. Chandra, et al., AVPGEN—A Generator for Architecture Verification Test Cases, IEEE Trans. Very Large Scale Integration (VLSI) Syst. 3, No. 2, pp. 188-200 (Jun. 1995).*
Y. Lichtenstein et al., *Model-Based Test Generation for Process Design Verification*, Sixth Innovative Applications of Artificial Intelligence Conference, Aug. 1994, pp. 83-94.
R. Emek, et al., *X-Gen, a random test-case generator for systems and SoCs*, Seventh IEEE International High-Level Design Validation and Test Workshop (HLDVT 2002).

(Continued)

*Primary Examiner*—John P Trimmings (57) ABSTRACT

Techniques are provided for modeling memory operations when generating test cases to verify multi-processor designs. Each memory operation has associated therewith a set of transfer attributes that can be referenced by a test generator. Using the transfer attributes, it is possible to generate a variety of interesting scenarios that handle read-write collisions and generally avoid reloading or resources. The model provides accurate result prediction, and allows write access restrictions to be removed from sensitive memory areas, such as control areas.

20 Claims, 5 Drawing Sheets

OTHER PUBLICATIONS

A. Adir and G. Shurek, *Generating Concurrent Test Programs with Collisions for Multi-Processor Verification*, HLDVT (2002).

E. Bin, R. Emek, G. Shurek, and A. Ziv, *Using Constraint Satisfaction Formulations and Solution Techniques for Random Test Program Generation*, IBM Systems Journal, 41(3): 386-402, Aug. 2002.

V. Kumar, *Algorithms for Constraint-Satisfaction Problems: A Survey*, A. I. Magazine, 13(1): 32-44, Spring 1992.

Tudruj et al., "Parallel system architecture based on dynamically configurable shared memory clusters", *Parallel Processing and Applied Mathematics. 4th International Conference, PPAM 2001. Revised Papers* (*Lecture Notes in Computer Science*, vol. 2328), 2002, p. 51-61.

Engel et al. "Simulation framework for multi-processor memory communications", *European Simulation and Modelling Conference 2005. ESM 2005*, 2005, p. 413-19.

\* cited by examiner

MEMORY MODEL FOR FUNCTIONAL VERIFICATION OF MULTI-PROCESSOR SYSTEMS

BACKGROUND OF THE INVENTION

1. Field of the Invention

This invention relates generally to design verification. More particularly, this invention relates to a memory model to support verification of functional verification of multi-processor systems.

2. Description of the Related Art

TABLE 1

| Acronyms and Abbreviations | |
| --- | --- |
| CSP | Constraint Satisfaction Problem |
| DMA | Direct Memory Access |
| DUT | Design-Under-Test |
| SoC | System on a Chip |

An important aspect of designing an advanced computer system having multiple processors is the ability to test the design of the processors thoroughly, in order to assure that the design complies with desired architectural, performance and design specifications. One known verification technique requires the generation of a large number of instruction sequences to assure that the processors behave properly under a wide variety of circumstances.

Test program generators are basically sophisticated software engines, which are used to create numerous test cases. By appropriate configuration, it is possible for test generation to be focused on very specific ranges of conditions, or broadened to cover a wide range of logic. Today, large numbers of test cases can be created automatically in the time that a single test case could be written manually, as was done prior to the advent of test case generators.

An example of a conventional test program generator is the IBM tool, Genesys, which is disclosed in the document *Model-Based Test Generation for Process Design Verification*, Y. Lichtenstein et al., Sixth Innovative Applications of Artificial Intelligence Conference, August 1994, pp. 83-94. An updated version, of Genesys, known as Genesys-Pro, is a generic random test generator, targeted at the architectural level and applicable to any architecture.

Another conventional test program generator, AVPGEN, is disclosed in the document *AVPGEN-A Generator for Architecture Verification Test Cases*, A. Chandra, et al., IEEE Trans. Very Large Scale Integration (VLSI) Syst. 3, No. 2, pp. 188-200 (June 1995).

X-Gen, a model-based test-case generator, is described in the document *X-Gen, a random test-case generator for systems and SoCs*, R. Emek, et al., Seventh IEEE International High-Level Design Validation and Test Workshop (HLDVT 2002). This test generator is specialized for use with multi-processor systems and systems on a chip (SoCs). X-Gen provides a framework and a set of building blocks for system-level test-case generation. Test program generation using X-Gen typically involves the resolution of constraints to make the tests legal and interesting for verification.

SUMMARY OF THE INVENTION

An embodiment of the invention provides a computer-implemented method for generation of a test program for functional verification of a design-under-test, such as a multi-processor design. The method is carried out by generation of a current memory operation wherein first data is transferred from a first source area, calculating a value of the first data, and recursively identifying at least one prior memory operation wherein second data is transferred from a second source area to a target area that overlaps the first source area. The method is further carried out by defining a constraint for the second data, determining that the second data complies with the constraint, setting at least a portion of the second data to a value of a corresponding portion of the first data, and thereafter generating a test case for the design-under-test that includes the prior memory operation and the current memory operation. Memory initializations are deferred until an end-of-test state is reached in the test generation.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well-known and will not be further discussed herein.

System Overview.

Figure 1:
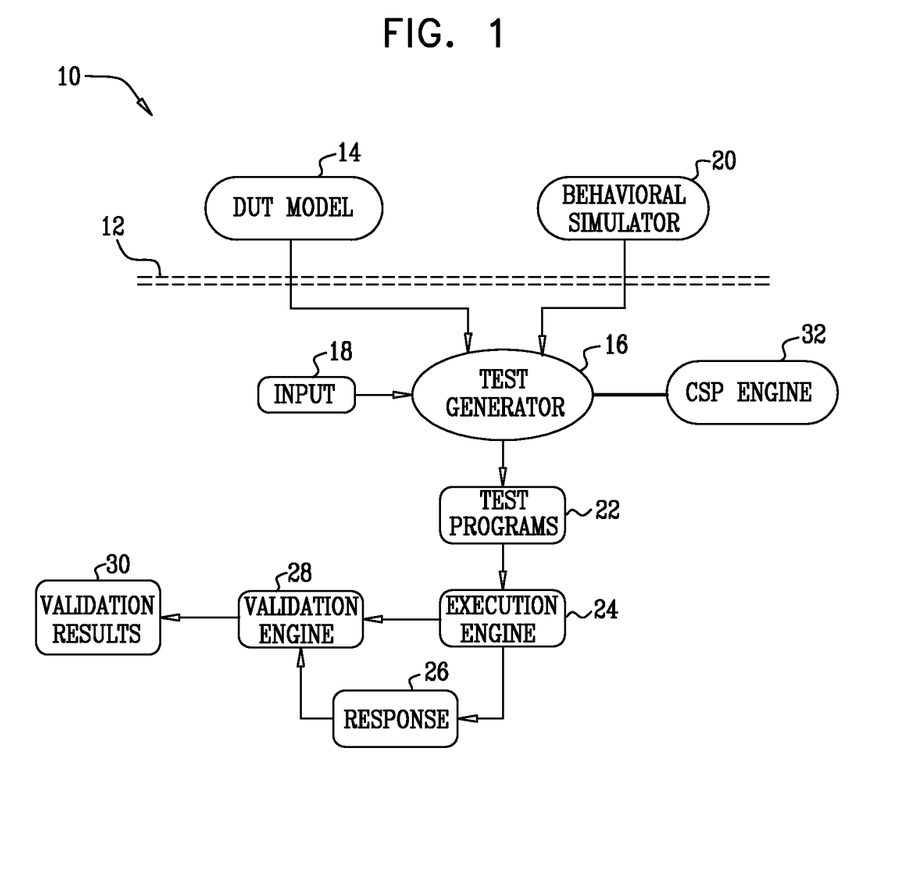
FIG. 1 is a block diagram of a verification system that is operable in accordance with a disclosed embodiment of the invention.

Turning now to the drawings, reference is made to FIG. 1, which is a block diagram of a verification system 10 that is operable in accordance with a disclosed embodiment of the invention. The teachings of the present invention are not restricted to systems that are configured like the verification system 10, but are applicable to many testing systems that have different architectures than the verification system 10. Typically, a design-under-test (DUT) is verified using a suite of test cases that are generated by the system.

The verification system 10 typically comprises a general purpose or embedded computer processor, which is programmed with suitable software for carrying out the functions described hereinbelow. Thus, although the verification system 10 is shown in FIG. 1 as comprising a number of separate functional blocks, these blocks are not necessarily separate physical entities, but rather represent different computing tasks or data objects stored in a memory that is accessible to the processor. These tasks may be carried out in software running on a single processor, or on multiple processors. The software may be provided to the processor or processors in electronic form, for example, over a network, or it may be furnished on tangible media, such as CD-ROM or non-volatile memory. Alternatively or additionally, the verification system 10 may comprise a digital signal processor or hard-wired logic.

In any case, the verification system 10 can be used for verifying a software or hardware implementation. The verification system 10 has several basic interacting components. Those components that are located above a broken line 12 are dependent on the specification of the design-under-test, while those located below the line 12 are independent of the specification.

The verification system 10 enables the creation of tests that have various degrees of randomness. The ability of the verification system 10 to introduce random unspecified values is desirable, since design flaws in practice are usually unpredictable.

A model 14 holds a formal description or specification of the design-under-test. This specification may be stored in a database, which may also incorporate testing knowledge of the system design, and may include testing constraints and coverage criteria.

A generic test program generator engine 16 has a user input 18, which influences the algorithms used to generate test cases.

An optional behavioral simulator 20 can be used to predict the results of instruction execution in accordance with the specification of the design-under-test. It is possible to employ the techniques of the invention in verification systems that do not employ a behavioral simulator.

Test programs 22 are executed by an execution engine 24 on an implementation of the design-under-test. The execution engine 24 can be a simulator of the design-under-test, or the design-under-test itself. The design-under-test can be a complex software implemented system, for example middleware, or a hardware simulator. Indeed, the design-under-test itself may be a simulator. The design-under-test is typically a multiprocessor system. Among issues to be tested are use of memory by the multiple processors of the design-under-test.

Execution of the test programs 22 stimulates the design-under-test, and produces a response 26. The response 26 is typically submitted to a validation process, represented in FIG. 1 as a validation engine 28, which has knowledge of the expected response, validates the response 26, and produces validation results 30. The time of execution of particular transfers is referred to herein as the "execution time".

In some embodiments, at least a portion of the instructions comprising the test programs 22 that are produced by the test program generator engine 16 are solutions of constraint satisfaction problems, which are formulated and solved using a CSP engine 32. This aspect is described in further detail below.

Memory Issues.

Continuing to refer to FIG. 1, memory plays a unique and important role in the verification of hardware systems with more than one processor. Contention by multiple processors for the same areas of memory may occur. Test coverage that includes transfers or accesses to such areas is necessary to assure that the design-under-test handles such memory contention issues correctly. As another example, values written to memory at any stage may need to be recovered in order to apply dynamic checking, or to verify end-of-test results.

One approach to handling memory when generating stimuli for the design-under-test involves a model in which memory is represented as a set of single memory cells (or resources), each representing a single byte of memory. In this model, sometimes referred to as the "conventional memory model", it is assumed that all accesses to memory are in integral multiples of a single byte. Each cell may contain information about itself, e.g., its address. Each cell may also maintain information about accesses involving it, e.g., the time of the access, and the data that was read or written during the access. This representation is a natural model of a physical memory, and can deal with random access to any set of cells in the memory.

In the conventional memory model, the value of the data transferred in each memory access must be known to the test program generator engine 16 at generation time. Generation time is a time when an individual test instruction that result in the particular memory access is generated. Reasons for this include a need for the data at a later stage for checking by the validation engine 28, control usage of the data, which may influence the generation of subsequent instructions, and end-of-test comparisons.

Despite its simplicity, the conventional memory model has significant drawbacks. Performance, in terms of speed and memory utilization to operate the conventional memory model can be poor. Sometimes an access is very long, e.g., a 4 KB DMA. Updating thousands of cells takes a significant amount of time, and consumes large amounts of memory in the test program generator engine 16. In scenarios involving multiple contentions for the same set of memory addresses, accurate result prediction becomes impossible. The reason for this is that the order of execution of the transfers is not known at generation time. Because of the complexities introduced by memory contention, results are calculated as the set of all possible combinations of data written to the cells. This calculation usually results in a much larger set than the set of possibilities that are actually experienced in the design-under-test.

In order to deal with the unpredictability of memory access results, write access to memory regions that affect control is restricted in some implementations of the conventional memory model. The memory cell acting as a data source cannot be guaranteed to contain needed values. The restriction guarantees the integrity of the control functions affected by these regions, but of course reduces test coverage. In other implementations, the restriction can be relaxed to apply only to write accesses under conditions in which there is known uncertainty in the results.

Thus, the conventional memory model restricts the set of test cases that can be generated. Most simply this is exemplified by the avoidance of read-write collisions. This means that once a memory cell has experienced a read access, it cannot be written to subsequently if the write access would enter data having a different value than was read in the read access. The reason for this is that the second access, that is the write access, could actually occur prior to the read access during execution, vitiating data that was intended to be read.

The value of data in a general purpose register holding a base address typically needs to be known at the time a transfer is made from the register into a memory cell. In order to guarantee this, each time a CPU 'store' instruction is generated, the register must be reloaded. Such reloading adds uninteresting noise to the test case. There are ways to deal with the reloading issue directly, as disclosed, for example, in the document *Improving Test Quality through Resource Reallocation*, A. Adir et al., HLDVT (2001). Nevertheless, such techniques are specific to transfers originating from CPU's, and are very difficult to apply to a more general model that includes other memory components.

All of these drawbacks significantly affect the overall quality of the test cases generated using the conventional memory model. To summarize: Large DMA's cannot be tested due to performance issues. End-of-test result inconsistencies, and hence design flaws may be obscured by lack of predictability. Writing on control regions in memory cannot be tested because of necessary restrictions on write access. Multiple read-write contentions cannot be tested because of inflexibility in test generation. Delicate CPU scenarios may not be created because of the extra noise caused by reloading of registers.

In order to reduce or overcome the above-noted drawbacks of the model described above, new data structures and algorithms have been found, which model hardware memory in a way suitable for stimuli generation in a multiprocessor design. In contrast to existing models, all information related to the state of the memory is described in terms of the data transfers taking place, and not in terms of the data written in the various memory resources. Furthermore, the actual value of the data transferred in each transfer is calculated at the latest possible time, and not at the time of generation of the transfer.

Embodiment 1

A memory model according to some aspects of the inventions (referred to herein as the "new memory model") is applicable to a multiprocessor hardware system with multiple memories, DMA engines, and interfacing components, e.g., busses, bridges. Many of the transfer operations described below occur according to whether the data being moved is "meaningful". Essentially, data is meaningful if the value of the data being transferred matters. Meaningful data is required to have a definite value, and is sometimes referred to herein as "specific data". For example, if the target of the transfer has a control function, the data being transferred will usually be meaningful.

Features.

As will become apparent from the description that follows, there are several advantages of the new memory model compared to the conventional memory model:

Runtime performance is enhanced. First, in cases involving transfer of data that is not meaningful, no data calculations need be undertaken with respect to source addresses. A second reason concerns large transfers (a few kilobytes or more). It will be recalled that extraction of data of each of the memory cells at the source, and the updating of a similar number of cells at source and target, was a limiting factor in the conventional memory model. In the new memory model, this is eliminated. The emphasis in the new model is the transfer of data from one memory cell to another, a cell having an arbitrary size in bytes. The cell, i.e., a region of bytes, is treated as a whole unit by the test generator. Thus, the test generator need not undertake individual byte updates when a large cell is being handled. This results in greatly enhanced memory performance.

In the new memory model all information is available as a list of all cell-oriented transfers occurring throughout the test generation. With this list, results at any stage (including end-of-test) can be obtained for cells of any size.

Result prediction is accurate in the new memory model. Thus, there are no artificial restrictions on writing to control or reserved areas. The new memory model guarantees that the calculated value is indeed the value that will be written. In addition, application of the new memory model can often force data previously written to the source of the current transfer to be equal to the data required at the target area.

Using the new memory model, many more scenarios can be generated than was possible using the conventional memory model. For example, the new memory model does not impose restrictions due to read-write collisions. At generation time, a read transfer is allowed to be generated prior to a write transfer. Nevertheless, during simulation, the value written in the 'write' transfer will be taken into account at the time the value 'read' is needed. This is a consequence of delayed initialization of memory, which is explained in further detail below.

Reloading of registers is generally unnecessary when using the new memory model, since data already present in the registers (garbage) can be used for a transfer. This is not the case for the conventional memory model, in which the data needs to be known at generation time of the transfer.

Transfer Attributes.

As noted above, the new memory model is transfer-oriented. At the stage of test generation, each transfer of data is associated with a set of attributes, referred to herein as "transfer attributes", which are sufficient to uniquely define a memory operation involving a transfer of data from a source address. Transfers so defined can be identified and manipulated by the test program generator engine 16 (FIG. 1) during its operation. Examples of this are presented below.

In current embodiments of the verification system 10, a transfer is defined by a set of nine transfer attributes. This is a set of exemplary attributes that the inventors have found to be useful. Other transfer attributes, not listed, may be added to the list when needed in particular applications. Furthermore, the new memory model may be configured to employ subsets and supersets of the following set of transfer attributes:

ID;
source address;
destination address;
initiator;
generation time stamp;
length;
atomicity;
is-data-meaningful; and
data.

Using the transfer attributes, all information related to the state of the memory is described in terms of the data-transfers taking place, and not in terms of the data written to the various memory resources. It will become apparent from the examples below that the actual values of meaningful data being moved in each transfer are determined at the latest possible time. The actual values are set by initializations that occur subsequent to the generation of transfer instructions by the test generator at generation time.

This set of transfer attributes defines a uniquely identified data transfer, specified by the attribute 'ID'. The 'length', 'source address' and 'destination address' attributes specify the length (in bits) of a transfer of data from a source address to a destination address. For identifying memory addresses, each address in memory is defined by a unique key, which may be the memory device identification, and the physical address identification in the device. The transfer is initiated by a hardware component specified by the 'initiator' attribute, and is generated at a time specified by the 'generation time stamp' attribute. The 'atomicity' attribute specifies the positions (bits) where the transfer can break. Such breakages occur in architecturally well-defined positions by components in the path of the transfer that cannot handle transfers exceeding a predetermined size. The use of atomicity and initiator attributes in data calculation is known from the document *Generating Concurrent Test Programs with Collisions for Multi-Processor Verification*, A. Adir and G. Shurek, HLDVT (2002), whose disclosure is herein incorporated by reference.

The is-data-meaningful parameter and data attributes are set bit-wise. Data is said to be meaningful for a bit having its is-data-meaningful attribute set to true. Some of the operations described below are only applicable to bits holding meaningful data. The is-data-meaningful attribute specifies the bits for which data must be determined at generation time for the transfer. In other words, the attribute 'data' is given a definite value in the generation process, only for those bits for which the is-data-meaningful attribute is true.

For each data transfer generated by the test program generator engine 16, all of the transfer attributes are resolved and saved, except as noted below.

By default, the is-data-meaningful attribute is initialized as 'false' for all bits. For bits in which the is-data-meaningful attribute remains false, the data attribute is not resolved, but remains indeterminate. In particular, there is no updating of memory cells with respect to such bits, and such bits are not initialized with specific data at generation time.

The is-data-meaningful attribute may be changed to 'true' for individual bits. This may happen in at least three situations:

(1) The user asked for specific data to be transferred;
(2) The target area overlaps a control area, which requires that specific data be transferred; and
(3) The target area overlaps the source area of a previously generated transfer and in the overlap there is at least one bit in which the is-data-meaningful attribute is true for the previous transfer.

At generation time in these three situations, the transfer attributes are generated as noted above, and data is calculated to comply with the situational requirements. Two additional operations take place at generation time:

First, the data attribute is updated for all previously-generated transfers in which the target area overlaps the source area of the current transfer, in order that their data attribute is consistent with the data transferred at the current transfer. Relevant previously generated transfers are identified by reference to the source address attribute of the current transfer, and the generation time stamp, destination address, and length attributes of candidate previously generated transfers. Another indicator of a relevant previously generated transfer is found in order control. Order control either specifies an order of execution for any two transfers, or indicates that the order is indeterminate. Knowledge provided by order control can often be exploited during test generation, as explained in further detail below in the section entitled Calculation of Data. Reference to previously generated transfers is done recursively. For each data transfer requiring an update of its data attribute, the data attributes respecting all other transfers having a target overlap therewith are also updated. That is to say, each transfer requiring an update of its data attribute is itself treated as a current transfer for this purpose. In some cases, the is-data-meaningful attribute is set to true at the update.

Second, source areas of each transfer undergoing update of its data attribute are initialized at completion of test generation (end-of-test) with the data being transferred from them. The data attribute of such transfers is modified accordingly. However, this step is performed only for those bits in the source areas holding meaningful data.

Recursion ends when a source area is encountered for which all bits have an is-data-meaningful attribute set to false.

These steps ensure that when data is meaningful it will actually be transferred when the test is executed by the execution engine 24. However, inconsistencies can sometimes occur. For example, it may happen that the source area of a current transfer was already the target of a previous transfer with meaningful data, but with data values different from the currently requested data. In this case, the current transfer cannot be generated, and a different approach must be chosen by the test program generator engine 16.

Calculation of Data.

Some general conditions requiring data to be calculated and propagated backward have been described. Under circumstances when details of a transfer are known, the calculation can be refined. Some of these circumstances are in common with the conventional memory model and other known memory models. These are not discussed in the interest of brevity. Other circumstances, however, are particular to the new memory model.

Figure 2:
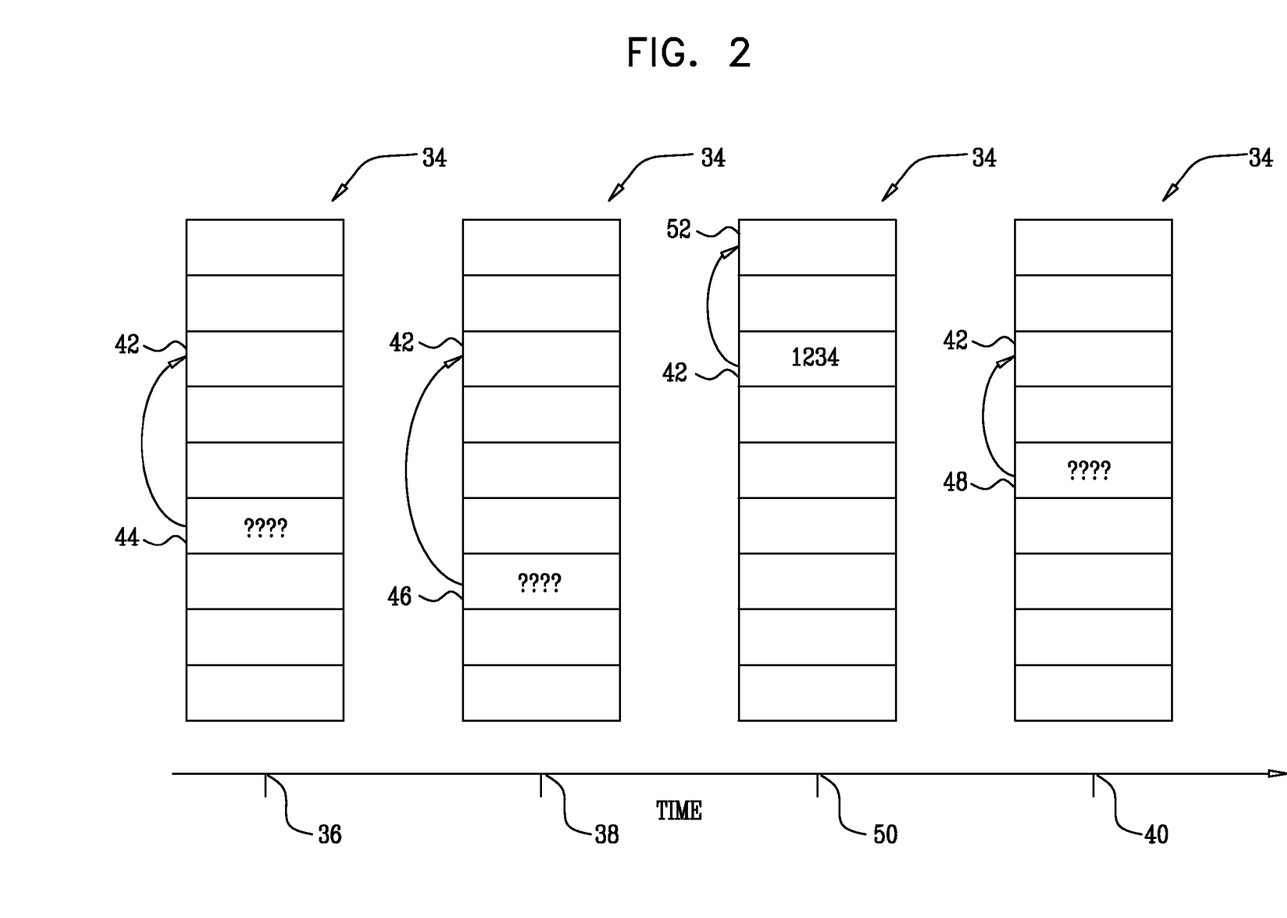
FIG. 2 is a pictorial diagram illustrating a sequence of memory transfers having a known execution order, in accordance with a disclosed embodiment of the invention.

Knowledge that some execution time order exists between any two particular transfers may allow more refined back-propagation of the data. Reference is now made to FIG. 2, which is a pictorial diagram illustrating a sequence of memory transfers having a known execution order, in accordance with a disclosed embodiment of the invention. A time ordered sequence of transfers within a group of memory cells 34 is known to occur at times 36, 38, 40, which involve writing of non-meaningful data to a memory area 42, indicated by the symbol "????" in their source areas 44, 46, 48. The transfer occurring at time 50 is currently generated, and requires meaningful data "1234" to be transferred from memory area 42 to a memory area 52. Since the transfer at time 50 is known to be executed prior to the transfer at time 40, the source areas 44, 46 of the transfers occurring at times 36, 38 need to be updated. The source area 48 of the transfer occurring at time 40 does not need to be updated.

The relationships among the execution times of the transfers depends on the initiator of the transfers. Different initiators may see different orders, as explained in the above-noted Adir and Shurek document. Accordingly, the calculation of data described above should take into account the particular initiators of the transfers in order for the test generator to compensate for the orders. It will be recalled that the initiator attribute is included among the transfer attributes described above.

Another aspect of data calculation to be taken into account is the atomicity of the transfers. When there is contention for a memory area, the possible values of the data read from the area depend on the atomicity of each of the transfers contending for the area, including the atomicity of the 'read' operation itself.

End-of-Test Initializations and Results.

After all transfers in a test have been generated, two additional tasks are performed. First, all memory resources accessed by any of the transfers and not already initialized as described above now need to be initialized. In the current embodiments, memory cells that do not serve as sources for meaningful data have not been initialized. Such areas are currently initialized randomly. Alternatively, a non-random initialization could be performed, using any suitable algorithm.

Second, once all memory cells are initialized, the expected results of accesses to all memory areas can be determined in order to allow comparison with simulation results. This determination is done in the same manner as described above in the section entitled "Calculation of Data", except that now it is done for all accessed regions, and not only for regions acting as sources for meaningful data transfers. In some embodiments of the verification system 10 (FIG. 1), the determination would exploit the facilities of the behavioral simulator 20.

Constraint Satisfaction.

The use of constraint satisfaction problem solution in test generation is described, for example, in commonly-assigned U.S. Patent Application Publication No. 2005/0222827, entitled *Accelerated Solution of Constraint Satisfaction Problems by Partitioning of the Variable Space*, whose disclosure is herein incorporated by reference. Constraint satisfaction techniques are further described in the document *Using Constraint Satisfaction Formulations and Solution Techniques for Random Test Program Generation*, E. Bin, R. Emek, G. Shurek, and A. Ziv, IBM Systems Journal, 41 (3): 386-402, August 2002, and the document *Algorithms for Constraint-Satisfaction Problems: A Survey*, V. Kumar, A. I. Magazine, 13(1): 32-44, Spring 1992, the disclosures of which are herein incorporated by reference.

Many of the tasks that are addressed by decision-making systems and artificial intelligence can be framed as constraint satisfaction problems (CSPs). In this framework, the task is specified in terms of a set of variables, each of which can assume values in a given domain, and a set of predicates, or constraints, that the variables must simultaneously satisfy. The set of variables and constraints is referred to as a constraint network. Each constraint may be expressed as a relation, defined over some subset of the variables, denoting valid combinations of their values. A solution to the problem (referred to herein-below as a "concrete solution") is an assignment of a value to each variable from its domain that satisfies all of the constraints.

For example, Bin et al. describe a constraint satisfaction method for use in automated generation of test programs, in a paper entitled "Using a Constraint Satisfaction Formulation and Solution Techniques for Random Test Program Generation," IBM Systems Journal 41:3 (2002), pages 386-402, whose disclosure is herein incorporated by reference. The authors show how random test program generation can be modeled as a CSP, and they describe a set of solution techniques that are used in practical test-case generation tools.

A number of constraint satisfaction systems are described in the patent literature. For example, U.S. Pat. No. 5,636,328, describes methods and apparatus for finding values that satisfy a set of constraints, applied particularly to control of a robotic arm. U.S. Pat. No. 5,617,510 describes a method, useful in computer-aided design, of identifying possible solutions to an over-constrained system having a collection of entities and constraints.

Continuing to refer to FIG. 1, the transfer attributes in the new memory model can be modeled as a constraint satisfaction problem that is submitted to the CSP engine 32 for solution. The various transfer attributes relating to at least some of the transfers are modeled as variables and various constraints are applied to them. For example, the length attribute could be set equal to the number of bits specified by the data attribute. The is-data-meaningful attribute might be set to true only for bits that are reserved on the target area, or for which the user specified the data. Then the attributes are resolved by generic CSP solving techniques.

Read-Write Collisions.

Figure 3:
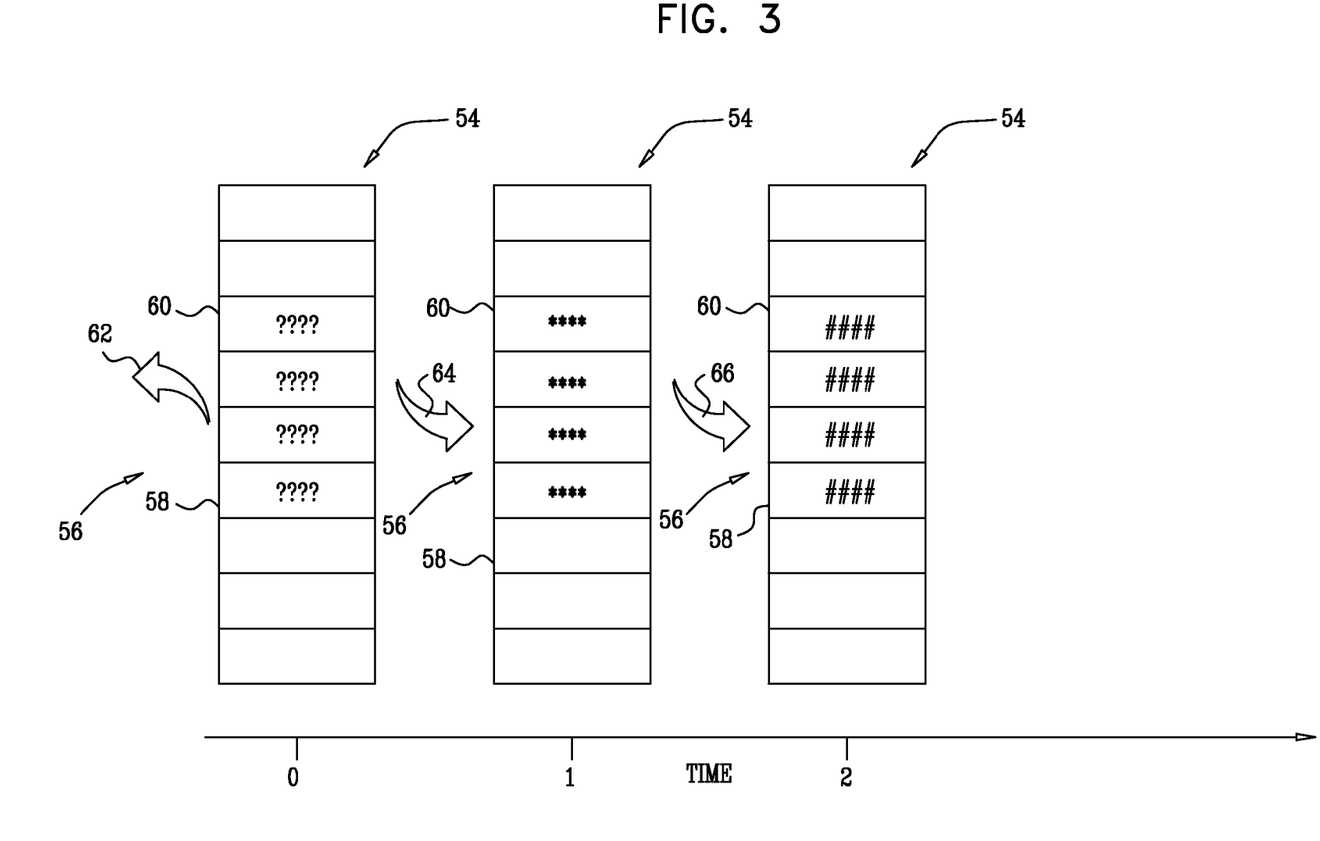
FIG. 3 is a pictorial diagram illustrating a scenario in which read-write collisions are handled in accordance with a disclosed embodiment of the invention.

The new memory model permits the generation of write accesses after read accesses in scenarios involving read-write collisions. Reference is now made to FIG. 3, which is a pictorial diagram illustrating an exemplary scenario in which read-write collisions are handled in accordance with a disclosed embodiment of the invention. There are instances of a memory 54, having a range 56 comprising four memory cells. The range 56 begins with a cell 58, whose arbitrary source address is, for example 0x0100, and ends at source address 0x0104, at a cell 60. The times specified are encoded in the respective generation time stamp attributes of the transfers. As described above, the is-data-meaningful and data attributes are set appropriately for each transfer. The range 56 is defined by the length attributes of each transfer.

At generation time 0, the range 56 holds meaningless data. A 4-byte read access of the range 56 is generated, indicated by an arrow 62.

Subsequently, at generation time 1, a 4-byte write access to the range 56 is generated, non-meaningful data (****) being written, indicated by an arrow 64. The data stored in the range 56 at the completion of the write access may now be different than immediately prior to time 1.

Subsequently, at generation time 2, another 4-byte write access to the range 56 is generated, non-meaningful data (####) being written, indicated by an arrow 66. The data stored in the range 56 at the completion of the write access may now be different than immediately prior to generation time 2.

The actual order of transfer execution is not constrained, i.e., during simulation the read access may be followed by the write accesses. Alternatively, the write accesses may precede the read access (so long as the data is meaningful). Initialization at end-of-test of both the source address of the write operation and the source address of the read operation guarantees that read operation retrieves the correct data at execution time.

Example 1

Using the verification system 10 (FIG. 1), the following transfers are to be generated by the test program generator engine 16. Data 0xABCD is to be present at a memory address 0x2000 throughout the whole simulation. In current embodiments of the verification system 10, the order of transfer execution is not known in advance; it is discovered at execution (except when order control is known in advance).

Transfer #1: move non-meaningful data of length 2 bytes from address 0x0000 to address 0x1000.

Transfer #2: move meaningful data of length 2 bytes from address 0x1000 to address 0x2000.

Transfer #3: move data 0xFFEE from address 0x0800 to address 0x1000.

Transfer #4: move non-meaningful data of length 2 bytes from address 0x2000 to address 0x3000.

Transfer #5: move non-meaningful data of length 2 bytes from address 0x1000 to address 0x3000.

The order of transfer execution by the execution engine 24 is #1, #3, #2, #4. The order or transfer #5 with respect to the other transfers is not specified. The test program generator engine 16 need not generate transfers in their execution order. Thus, the generation sequence described below is exemplary.

At the outset memory is not yet initialized. The user, e.g., via the user input 18 requests that specific data 0xABCD be placed at address 0x2000.

Transfers #1 and #2 are generated by the test program generator engine 16. The data at 0x2000, the target of transfer #2, is meaningful. This data must be supplied at the source of transfer #2. To that end, all previously generated transfers (identified by the transfer's generation time stamp attribute) whose target area overlaps the source area of transfer #2 must be evaluated. If, at execution time, any previously generated transfer could be executed prior to transfer #2, then the data moved in the previously generated transfer is required to be compatible with the data moved in transfer #2. The determination of compatibility is made by reference to the respective is-data-meaningful and data attributes of the previously generated transfers. For all such previously generated transfers, a constraint is placed on the data at their respective source locations—the constrained source data must be available in the respective source locations at the time of the execution of transfer #2.

In this example, transfer #1 is executed by the execution engine 24 before transfer #2. Furthermore, the target area of transfer #1 (0x1000) and the source area of transfer #2 (0x1000) clearly overlap. Therefore, the above-noted constraint is placed on the source data of transfer #1. Specifically, the source data of transfer #1 must be 0xABCD.

During execution transfer #3 will occur before transfer #2, but after transfer #1. The source area of transfer #2 (0x1000) overlaps the target area of transfer #3 (0x1000). The data moved in transfer #3 (0xFFEE) is not compatible with the data of transfer #2, and the above-noted constraint cannot be satisfied. Therefore, the generation of transfer #3 is abandoned.

The is-data-meaningful attribute of transfer #3 is set to true. As discussed above, transfer data may be meaningful either because specific data was required to be moved in the transfer, or a transfer destination area is known to contain meaningful data at execution time of the transfer.

Assuming that transfer #3 was successful, transfer #4 and transfer #5 are generated. The same issues with respect to the overlaps of the source and target areas are considered. Here the source area of transfer #4 (0x2000) does not overlap the target area of transfer #5 (0x3000). Similarly, the source area of transfer #5 (0x1000) does not overlap the target area of transfer #4 (0x3000) . Thus, no data compatibility requirements are imposed as to these two transfers.

A summary of the conditions, operations under-taken in generating transfers #1-#5, and results are given in Table 2. Results are calculated at end-of-test, after all the transfers have been executed by the execution engine 24. In the case of address 0x3000, the actual data depend on the order of completion of transfers #4 and #5.

TABLE 2

| Address | Function | Initialized Data | Initialization Conditions | Result Calculation |
|---|---|---|---|---|
| 0x0000 | Source of transfer #1 | 0xABCD | Must obey restriction on transfer #1 data | 0xABCD |
| 0x1000 | Target of transfer #1. Source of transfer #2 Source of transfer #5 | 0x1234 | May be arbitrary. Transfer #1 overrides initialization. | 0xABCD |
| 0x2000 | Target of transfer #2. Source of transfer #4 | 0xABCD | | 0xABCD |
| 0x3000 | Target of transfer #4. Target of transfer #5 | 0x5678 | Unrestricted. May be arbitrary data | 0xABCD or 0x1234 |

Operation.

Figure 4:
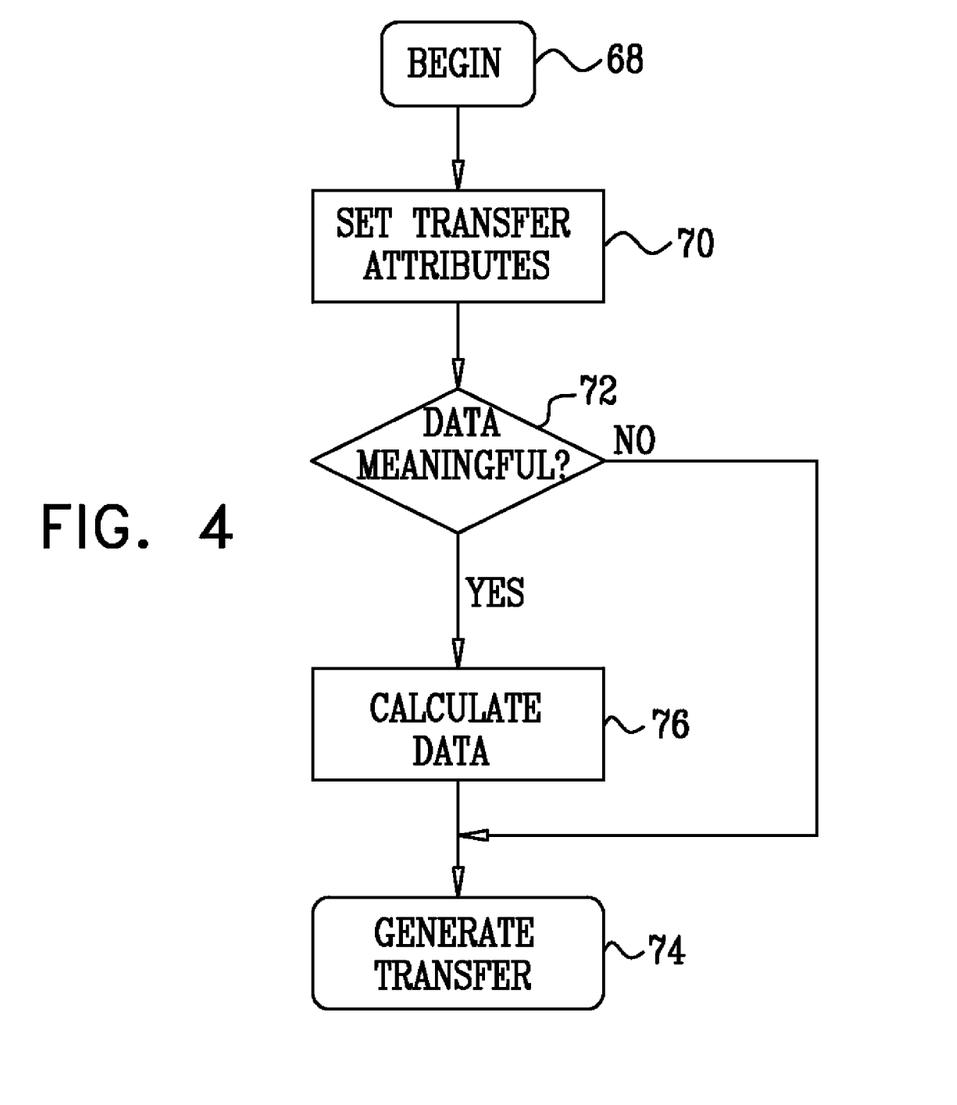
FIG. 4 is a high level flow chart of a method for using a memory model to support stimuli generation for functional verification of multi-processor systems in accordance with a disclosed embodiment of the invention.

Reference is now made to FIG. 4, which is a high level flow chart of a method for using a memory model to support stimuli generation for functional verification of multi-processor systems, in accordance with a disclosed embodiment of the invention. At initial step 68 it is determined that a memory transfer is required as part of a test for stimulating a design-under-test.

Next, at step 70, transfer attributes are set for the transfer. As noted above, some of the transfer attributes have default values, which, are changed under certain circumstances. Others are set according to the scenario. For example the initiator, length, and time stamp attributes for the transfer may be set at this time.

Control now proceeds to decision step 72, where it is determined if the data being transferred is meaningful. If the determination at decision step 72 is negative, then control proceeds to final step 74, which is described below.

If the determination at decision step 72 is affirmative, then control proceeds to step 76, where data is calculated for memory cells to comply with situational requirements, and the transfer's data attribute modified as necessary. Recursive back propagation of data is sometimes required in order to deal with prior transfers whose target areas overlap the source area of the current transfer.

At final step 74, the transfer is actually generated. It should be noted that no actual initialization of source addresses with respect to the specific data being transferred has occurred. Such initializations are deferred until all transfers of the test have been generated.

Figure 5:
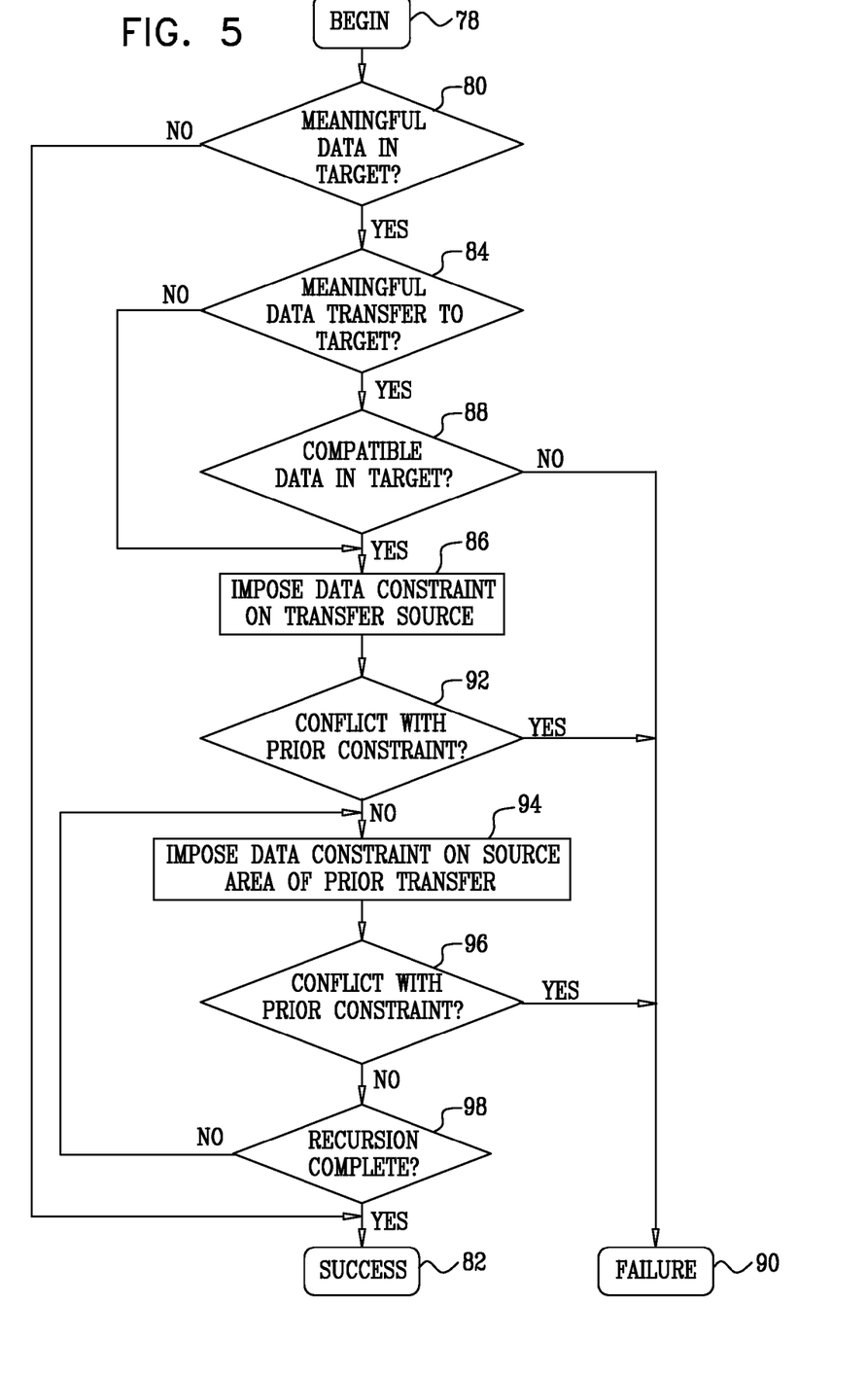
FIG. 5 is a detailed flow chart of some aspects of the method shown in FIG. 4 in accordance with a disclosed embodiment of the invention.

Reference is now made to FIG. 5, which is a detailed flow chart of some aspects of the method shown in FIG. 4 in accordance with a disclosed embodiment of the invention. The process steps are shown in a linear sequence in FIG. 5 for clarity of presentation. However, it will be evident that many of them can be performed in parallel, asynchronously, or in different orders.

The process begins at initial step 78, where it is established during test generation that a memory transfer needs to be executed.

Control immediately proceeds to decision step 80, where it is determined if the target of the transfer contains meaningful data. If the determination at decision step 80 is negative, then control proceeds directly to final step 82, which is described below.

If the determination at decision step 80 is affirmative, then control proceeds to decision step 84, where it is determined if specific data is to be transferred to the target.

If the determination at decision step 84 is negative, then control proceeds to step 86, which is described below.

If the determination at decision step 84 is affirmative, then control proceeds to decision step 88. Here a determination is made whether the specific data to be transferred is compatible with the data presently in the target of the transfer.

If the determination at decision step 88 is negative, then control proceeds to final step 90. Generation of the transfer cannot be accomplished, and the procedure terminates in failure.

If the determination at decision step 88 is affirmative, or meaningful data is not being transferred (the determination at decision step 84 was negative), then at step 86, a data restriction is imposed on the data source of the transfer, as described above in the section entitled "Transfer Attributes". The data attribute of the transfer is updated to reflect the new restriction, and the is-data-meaningful attribute is set to true.

Next, at decision step 92 it is noted whether the data restriction currently being imposed conflicts with a previously imposed restriction.

If the determination at decision step 92 is affirmative, then control proceeds to final step 90. Generation of the transfer cannot be accomplished, and the procedure terminates in failure.

If the determination at decision step 92 is negative, then at step 94 a meaningful data restriction is imposed on a previously generated transfer in which the target area overlaps the source area of the current transfer source area. The data attribute of the source area of the prior transfer is updated and the is-data-meaningful attribute is set to true. It will be recalled that this step is recursive, and thus step 94 is performed iteratively.

Control now proceeds to decision step 96, where it is determined if the constraint imposed in the last iteration of step 94 conflicts with an existing constraint on the source area.

If the determination at decision step 96 is affirmative, then control proceeds to final step 90. Generation of the transfer cannot be accomplished, and the procedure terminates in failure.

If the determination at decision step 96 is negative, then control proceeds to decision step 98, where it is determined if recursion is complete—that is all relevant previously generated transfers have been considered.

If the determination at decision step 98 is negative, then control returns to step 94 for iteration using another previously generated transfer.

If the determination at decision step 98 is affirmative, then the new data restriction being imposed is compatible with all relevant existing data restrictions. Control proceeds to final step 82. It is concluded that the transfer can be generated.

Embodiment 2

Embodiment 1 deals only with the case where the data reaching the target area is equal to that leaving the source area (up to possible breakage of atomicity). In an alternate embodiment of the invention, the new memory model shown in Embodiment 1 is enhanced to include rules through which data mutates during a transfer. In order to support this, an inverse function that returns the data as it existed prior to its mutation should be provided by the user. This function gives the possible set of source data for any given target data. Once this function is known, it is straightforward to enhance the new memory model to deal with data mutations, by applying the function when calculating source data, as described above.

In this embodiment, the source data is generalized to multiple sources of data, e.g., $C=f(A,B)$, where C is the target area, and A, B are the source areas. The user-provided inverse function $f^{-1}$ returns a set of all values of the source areas A and B that are compatible with a value of the target area C.

Embodiment 3

Simultaneous transfers are enabled in an alternate embodiment of the invention. In the previous embodiments, cases are described involving the generation of a single transfer at generation time. In this embodiment, the new memory model supports generation of multiple simultaneous transfers by the test program generator engine 16 (FIG. 1). A synchronization function is provided in the test program generator engine 16 to coordinate among all source and target areas of the simultaneous transfers. This function prevents generation of scenarios in which two simultaneous transfers require simultaneous reading of meaningful but different data from the same source area. The synchronization function can be easily implemented by a variety of methods, for example CSP formulation. Using the synchronization function, data calculations are performed as described above, except that the calculations now take into account not only all previous transfers, but also all current transfers. Simultaneous transfers can represent at least two different types hardware mechanisms: (1) independent transfers created by different transactions generated simultaneously; and (2) 'vector transfers' created by a single transaction, e.g., a multicast transaction.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A computer-implemented method for generation of a test program for functional verification of a design-under-test, comprising the steps of:

for a current memory operation wherein first data is transferred from a first source area calculating a value of said first data;

identifying a prior memory operation wherein second data is transferred from a second source area to a target area that overlaps said first source area;

defining a constraint for said second data;

determining that said second data complies with said constraint;

setting at least a portion of said second data to a value of a corresponding portion of said first data; and thereafter generating a test case for said design-under-test comprising said prior memory operation and said current memory operation.

2. The method according to claim 1, further comprising the step of defining a restriction on said second data, wherein said step of setting at least a portion of said second data is performed only when said second data satisfies said restriction.

3. The method according to claim 1, further comprising the step of mutating said first data and said second data; and determining that said second data satisfies said restriction comprises determining a respective pre-mutation state of said first data and said second data.

4. The method according to claim 1, wherein said step of generating a test case comprises:
   generating instructions for said design-under-test that effect said current memory operation and said prior memory operation to reach an end-of-test state; and thereafter; and
   initializing said first source area and said second source area.

5. A computer-implemented method for generation of a test program for functional verification of a design-under-test, comprising the steps of:
   associating a set of transfer attributes with respective memory operations to be conducted by said design-under-test, said memory operations each having a respective source area, and comprising a transfer of data from said source area;
   in a current memory operation calculating said data and modifying said transfer attributes according to said calculated data;
   referencing said transfer attributes of said memory operations to recursively identify prior memory operations having respective target areas that overlap said source area of said current memory operation;
   updating said transfer attributes of said prior memory operations according to said calculated data of said current memory operation; and
   thereafter generating a test case for said design-under-test comprising said prior memory operations and said current memory operation.

6. The method according to claim 5, wherein said step of referencing is only performed with respect to said memory operations wherein at least a portion of said data thereof is specific data.

7. The method according to claim 6, wherein said transfer attributes of said memory operations comprise an indicator that said data is required to be specific data.

8. The method according to claim 5, wherein said transfer attributes of said memory operations comprise an indicator of an atomicity of said memory operations, respectively.

9. The method according to claim 5, further comprising the steps of:
   modeling said transfer attributes as a constraint satisfaction problem;
   solving said constraint satisfaction problem; and
   setting said transfer attributes responsively to said step of solving.

10. The method according to claim 5, wherein said step of referencing said transfer attributes comprises the steps of:
    defining a restriction on said data of said prior memory operations; and
    determining that said data of said prior memory operations satisfies said restriction.

11. The method according to claim 5, further comprising the step of mutating said data of said memory operations; and
    recording said mutated data in said transfer attributes, respectively, wherein said step of referencing said transfer attributes comprises determining a pre-mutation state of said mutated data thereof.

12. The method according to claim 5, wherein said current memory operation comprises a plurality of current memory operations that are executed simultaneously in said test program, and said step of referencing with respect to one of said current memory operations further comprises recursively identifying others of said current memory operations said transfer attributes of said other current memory operations wherein said respective target areas thereof overlap said source area of said one current memory operation.

13. A computer software product for generation of a test program for functional verification of a design-under-test, including a tangible computer-readable medium in which computer program instructions are stored, which instructions, when read by a computer, cause the computer to:
    associate a set of transfer attributes with respective memory operations to be conducted by said design-under-test, said memory operations each having a source area, and comprising a transfer of data from said source area;
    in a current one of said memory operations calculate said data and modify said transfer attributes according to said calculated data;
    reference said transfer attributes of said memory operations to recursively identify prior memory operations having a target area that overlap said source area of said current memory operation;
    update said transfer attributes of said prior memory operations according to said calculated data of said current memory operation; and
    thereafter generate said current memory operation for incorporation in said test program.

14. The computer software product according to claim 13, wherein said computer is further instructed to:
    model said transfer attributes as a constraint satisfaction problem;
    solve said constraint satisfaction problem, and
    set said transfer attributes responsively to a solution of said constraint satisfaction problem.

15. The computer software product according to claim 13, wherein said computer is further instructed to:
    define a restriction on said data of said prior memory operations; and
    determine that said data of said prior memory operations satisfies said restriction.

16. A test generation system for generation of a test program for functional verification of a design-under-test, comprising:
    a memory, arranged to store a model describing said design-under-test; and
    a test generator engine that accesses said memory, said test generator engine operative to:
    associate a set of transfer attributes with respective memory operations to be conducted by said design-under-test, said memory operations each having a source area, and comprising a transfer of data from said source area;
    in a current one of said memory operations calculate said data and modify said transfer attributes according to said calculated data;
    reference said transfer attributes of said memory operations to recursively identify prior memory operations having a target area that overlap said source area of said current memory operation;
    update said transfer attributes of said prior memory operations according to said calculated data of said current memory operation; and
    thereafter generate said current memory operation for incorporation in said test program.

17. The test generation system according to claim 16, wherein said test generator engine is operative to reach an end-of-test state by generating said current memory operation and all other memory operations of a test being generated and to thereafter initialize said source area.

18. The test generation system according to claim 16, wherein said test generator engine is operative to reference said transfer attributes only with respect to said memory operations wherein at least a portion of said data thereof is meaningful data.

19. The test generation system according to claim 16, further comprising a constraint satisfaction problem engine linked to said test generator engine, wherein said constraint satisfaction problem engine is operative to formulate a constraint satisfaction problem from said transfer attributes and solve said constraint satisfaction problem; and said test generator engine is cooperative with said constraint satisfaction problem engine to set said transfer attributes responsively to a solution of said constraint satisfaction problem.

20. The test generation system according to claim 16, wherein said test generator engine is operative to:
define a restriction on said data of said prior memory operations; and
determine that said data of said prior memory operations satisfies said restriction.

* * * * *